(No Model.)
A. SCHNEIDER.
VALVE FOR BEER TANKS.
No. 507,636. Patented Oct. 31, 1893.
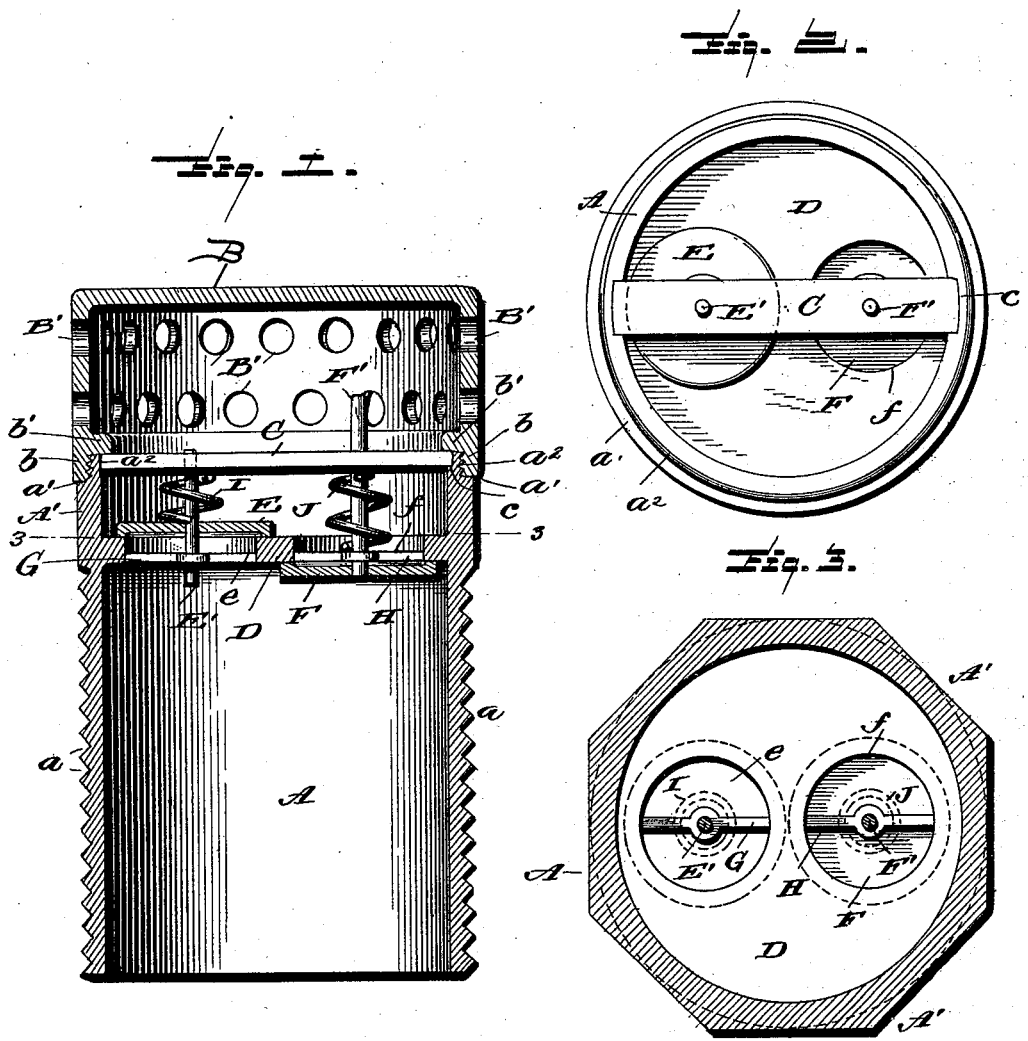

UNITED STATES PATENT OFFICE.

AUGUST SCHNEIDER, OF BETHLEHEM, PENNSYLVANIA.

VALVE FOR BEER-TANKS.

SPECIFICATION forming part of Letters Patent No. 507,636, dated October 31, 1893.

Application filed May 18, 1893. Serial No. 474,703. (No model.)

*To all whom it may concern:*

Be it known that I, AUGUST SCHNEIDER, a citizen of the United States, residing at Bethlehem, in the county of Northampton, State of Pennsylvania, have invented certain new and useful Improvements in Valves for Beer-Tanks, of which the following is a specification, reference being had therein to the accompanying drawings This invention relates to certain new and useful improvements in valves or plugs designed primarily for use in connection with beer tanks in the brewing of beer into which the beer is pumped and kept at rest until fit for use. It is a well known fact that these tanks must be kept air tight until the beer is to be drawn from them; it is also well known that there is more or less danger of these tanks bursting. My valve is intended to be secured in the top of the tank and is so constructed as to automatically open when the pressure within the tank exceeds a given limit; it is also arranged to admit air when the beer is being drawn from the spigot; both valves being operated automatically, the one by the excess of pressure within the tank to prevent bursting, and the other by the opening of the spigot to admit air so that the beer will run freely. The valve can be easily applied to any tank at little expense, is composed of few parts, those compactly arranged, and provision is made for ready separation to give access to the parts in case of injury or derangement.

Other objects and advantages of the invention will hereinafter appear and the novel features thereof will be specifically defined by the appended claims.

The invention is clearly illustrated in the accompanying drawings, which, with the letters of reference marked thereon, form a part of this specification, and in which—

Figure 1 is a central longitudinal section through my improved valve. Fig. 2 is a top plan with the cap removed. Fig. 3 is a horizontal section on the line 3—3 of Fig. 1, looking down.

Like letters of reference indicate like parts throughout the several views.

Referring now to the details of the drawings by letter, A designates the body portion of the valve which is in the form of a cylinder provided with exterior screw threads $a$ and a polygonal band $A'$ by which and a suitable tool, as a wrench, it may be easily screwed into a hole in the wall, preferably the top, of a tank, not shown. Near its outer end this body portion is formed with a rabbet to form an annular shoulder $a'$ as seen in Fig. 1, and an annular screw threaded ring $a^2$ as is also shown in Fig. 1 to engage the threaded portion $b$ of the cap B which has also an inwardly-extending flange $b'$ as shown in Fig. 1 to bear against the end of the threaded ring of the body portion as shown. This cap is provided with a plurality of holes $B'$ through which the air is admitted when the beer is drawn and through which it is allowed to escape when the pressure within the tank exceeds a predetermined amount. The ring portion $a^2$ of the body portion is formed with diametrically opposite notches $c$ in which is placed the cross bar C which is held in place by the flange $b'$ of the cap as shown in Fig. 1. Near its outer end the body portion is formed with a diaphragm D which has two diametric openings $e$ and $f$ which are closed by the valves E and F respectively. The stems $E'$ and $F'$ of these valves are guided in the cross bar C and in the spiders G and H and are fitted to seats upon opposite sides of the diaphragm. I and J are springs around the stems for holding the valves to their seats.

With the parts constructed and arranged substantially as above set forth the operation is as follows:—The valve is screwed into the tank, preferably in the top, and normally both the valves E and F are closed. When the pressure within the tank becomes increased sufficiently to overcome the tension of the spring I the valve E will be automatically opened outward and the air and gas escape, and pass out the openings $B'$ in the cap. When the spigot is turned to draw off the beer the valve F opens inward and air is admitted through the openings $B'$.

Modifications in detail may be resorted to without departing from the spirit of the invention or sacrificing any of its advantages.

What I claim as new is—

1. The combination with the body portion with its oppositely-operating valves, of a cap provided with openings, and a cross bar held by said cap and serving as a guide for the valve stems substantially as and for the purpose specified.

2. The combination with the body portion having independently-operating oppositely-movable spring actuated valves, of a cap having openings, and a cross bar held by said cap and serving as a guide for the valve stems substantially as and for the purpose specified.

3. The combination with the body portion with screw threads and polygonal band, of a removable cap secured to said band and provided with openings, and independently-operating oppositely-movable spring actuated valves, substantially as specified.

4. The combination with the body portion with its screw threads, polygonal band and diaphragm, of the independently-operated automatically oppositely-movable valves seated over openings in the diaphragm, the cross bar, the cap holding the same in place and springs between said cross bar and valves for holding the valves to their seats, substantially as specified.

5. The combination with the body portion with its screw threads, polygonal band, diaphragm, rabbet and threaded ring with diametric notches, of the cross bar seated in said notches, the cap with openings, threads and inwardly extending flange holding the cross bar in position in the notches, and the independently-automatically-operated oppositely-movable valves seated over openings in the diaphragm, substantially as specified.

In testimony whereof I affix my signature in presence of two witnesses.

AUGUST SCHNEIDER.

Witnesses:
   J. S. BREINIG,
   J. B. KEMERER.